(12) United States Patent
Myojo (10) Patent No.: US 9,291,844 B2
(45) Date of Patent: Mar. 22, 2016

(54) DISPLAY DEVICE AND TELEVISION RECEIVER (71) Applicant: Sharp Kabushiki Kaisha, Osaka (JP)

(72) Inventor: Toshiyuki Myojo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/407,699

(22) PCT Filed: Jun. 12, 2013

(86) PCT No.: PCT/JP2013/066188
§ 371 (c)(1),
(2) Date: Dec. 12, 2014

(87) PCT Pub. No.: WO2013/191050
PCT Pub. Date: Dec. 27, 2013

(65) Prior Publication Data
US 2015/0116598 A1    Apr. 30, 2015

(30) Foreign Application Priority Data
Jun. 19, 2012  (JP) ................. 2012-137789

(51) Int. Cl.
*G02F 1/1333* (2006.01)
*G02F 1/1335* (2006.01)
*F21V 8/00* (2006.01)
*H04N 5/64* (2006.01)

(52) U.S. Cl.
CPC .......... *G02F 1/133308* (2013.01); *G02B 6/009* (2013.01); *G02B 6/0081* (2013.01); *G02B 6/0085* (2013.01); *G02B 6/0088* (2013.01); *G02F 1/1336* (2013.01); *G02F 1/133615* (2013.01); *H04N 5/64* (2013.01); *G02F 2001/13332* (2013.01); *G02F 2001/133314* (2013.01); *G02F 2001/133317* (2013.01); *G02F 2001/133628* (2013.01)

(58) Field of Classification Search
CPC .............. G02F 2001/133314; G02F 1/133308; G02F 1/1336; G02F 1/133615; G02B 6/0085; G02B 6/0081; G02B 6/009; G02B 6/0088; H04N 5/64
See application file for complete search history.

(56) References Cited

U.S. PATENT DOCUMENTS

| 9,081,126 | B2* | 7/2015 | Ishimoto | ............... G02B 6/0085 |
| 2010/0118514 | A1* | 5/2010 | Cho | .................... G02B 6/0068 362/97.1 |
| 2010/0165239 | A1* | 7/2010 | Lee | ................... G02F 1/133385 349/58 |
| 2012/0300434 | A1* | 11/2012 | Tien | .................. G02F 1/133308 362/97.1 |

FOREIGN PATENT DOCUMENTS

JP    2010-170922 A    8/2010

* cited by examiner

*Primary Examiner* — James Dudek
(74) *Attorney, Agent, or Firm* — Chen Yoshimura LLP (57) ABSTRACT

A liquid crystal display device (display device) is provided with: LEDs (light source); a liquid crystal panel (display panel); a light guide plate; a chassis that is disposed on the opposite side of the light guide plate from the liquid crystal panel, is formed in a plate shape, and has a chassis side recessed and protruding part formed from recessed parts and protruding parts arranged along the plate surface direction of the chassis on a plate surface on the light guide plate side; and a frame (frame member) that is arranged on a display surface side of the liquid crystal panel, accommodates the LEDs, liquid crystal panel, and light guide plate within the chassis, has the LEDs attached thereto, has a frame side recessed and protruding part that can mate with the chassis side recessed and protruding part, and also has the frame side recessed and protruding part mated with the chassis side recessed and protruding part.

18 Claims, 10 Drawing Sheets

DISPLAY DEVICE AND TELEVISION RECEIVER

TECHNICAL FIELD

The present invention relates to a display device and a television receiver.

BACKGROUND ART

In liquid crystal display devices such as a liquid crystal television, a display panel that is a liquid crystal panel does not emit light, and therefore, it is necessary to separately provide a backlight device as an illumination device, for example. An example of the backlight device is described in Patent Document 1 below.

RELATED ART DOCUMENT

Patent Document

Patent Document 1: Japanese Patent Application Laid-Open Publication No. 2010-170922

Problems To Be Solved By The Invention

A liquid crystal display device similar to those mentioned above has a liquid crystal display unit in which a liquid crystal panel and a backlight device are held as an assembled component by a metal bezel that is placed over the liquid crystal panel from the front side thereof, and typically, the liquid crystal display unit is enclosed by a synthetic resin cabinet that is an exterior member, thereby forming a product.

However, recently, because of demands for lower manufacturing cost, thinner devices, and the like, elimination of the synthetic resin cabinet is being considered. If the cabinet is eliminated, however, the frame members such as the bezel that were housed in the cabinet in the conventional configuration are exposed to the outside. These members receive heat from the light source, and are therefore likely to be hot. Thus, there is demand for suppressing the frame member from reaching high temperatures as a precaution for when a user or the like touches the frame member.

Furthermore, if a configuration in which the light source is attached to the frame member is adopted, then the effect of the temperature of the frame member on the LED is great, and there is a concern of shorter lifespan of the light source or the like due to the increase in temperature of the frame member.

SUMMARY OF THE INVENTION

The present invention has been completed in view of the situation mentioned above, and an object thereof is to suppress the increase in temperature of the frame member and to provide a display device that can mitigate shortened lifespan in the light source.

Means For Solving The Problems

A display device of the present invention includes: a light source; a display panel that performs display using light from the light source; a light guide plate arranged to overlap a rear side of the display panel opposite to a display surface thereof, the light guide plate having a side face facing the light source; a chassis disposed on a rear side of the light guide plate opposite to the display panel, the chassis having a plate shape with recesses and protrusions aligned on a front surface thereof; and a frame member disposed on the display surface side of the display panel, the frame member and the chassis housing therebetween the light source, the display panel, and the light guide plate, the frame member having the light source attached thereto and having recesses and protrusions that can engage the recesses and the protrusions of the chassis, the recesses and the protrusions of the frame member engaging the recesses and the protrusions of the chassis.

According to this type of configuration, the recesses and protrusions of the frame are respectively engaged to the recesses and protrusions of the chassis, and the area in which the frame member and the chassis are in contact can be made larger. Thus, the heat generated by the light source that is transferred to the frame can be efficiently transferred from the recesses and protrusions of the frame to the recesses and protrusions of the chassis. Then, the heat that is transferred to the entire chassis from the recesses and protrusions of the chassis can be dissipated from the chassis. As a result, compared to a display device that does not have the recesses and protrusions of the frame and the recesses and protrusions of the chassis, the temperature of the frame member can be made low in the present invention, safety for when a user touches the frame member is excellent, and a shortened lifespan of the light source due to the frame member reaching high temperatures can be mitigated.

As embodiments of the present invention, the following configurations are preferred.

(1) The display device mentioned above, wherein a pattern of the recesses and the protrusions of the chassis extends along an edge portion of the chassis. According to this configuration, the rigidity of the chassis can be improved in the direction along an edge portion of the chassis.

(2) The display device mentioned above, wherein the recesses and the protrusions are provided on an entire periphery of the chassis. According to this type of configuration, the flatness of the plate surface of the chassis can be increased.

(3) The protrusions of the chassis are a plurality of ribs protruding from the front surface of the chassis. According to this type of configuration, recesses and protrusions of the chassis can be provided with ease.

(4) The recesses and the protrusions of the frame member and the recesses and the protrusions of the chassis engage each other through thermal grease or a thermal sheet. According to this type of configuration, heat can be transmitted from the recesses and protrusions of the frame to the recesses and protrusions of the chassis with greater ease, and thus, the temperature of the frame member could be kept even lower.

(5) According to this type of configuration, the chassis abutting portion is adjacent to the light source attachment section, and thus, the heat transferred from the light source to the light source attachment section can be efficiently transferred to the chassis abutting portion.

(6) The frame member has an L shape in a cross-sectional view, and further includes an exterior member forming an exterior of the display device. According to this type of configuration, the frame member has a light source attachment section and an exterior member separate from the chassis abutting portion, and thus, the exterior member that the user is likely to come into contact with is less likely to reach high temperatures. Therefore, safety for when a user directly touches the frame member is excellent.

(7) The display device further includes a light source substrate where the light source is mounted, wherein the light source is attached to the frame member through the light source substrate. According to this type of configuration, heat from the light source can be transferred from the light source generally having a conductive route with excellent heat conductivity to the frame member. Thus, heat from the light source can be transferred to the frame member with greater ease.

(8) The display device further includes: a heat dissipating member to which the light source substrate is attached, wherein the light source substrate is attached to the frame member through the heat dissipating member. According to this type of configuration, heat from the light source can be transferred to the frame member through the light source substrate and the heat dissipating member so as to cause the heat from the light source to be transferred to the frame member with even greater ease.

(9) The light source is a white-light emitting diode. According to this type of configuration, a reduction in power consumption of the light source is possible while further increasing the lifespan of the light source.

(10) The display panel is a liquid crystal panel including a pair of substrates and liquid crystal sealed therebetween. As a liquid crystal display device, such display devices can be used in various applications such as a television or a display of a personal computer, for example, and are particularly suitable for large screens.

EFFECTS OF THE INVENTION

According to the present invention, a display device that can suppress the increase in temperature of the frame member and also mitigate a decrease in lifespan of the light source can be provided.

DETAILED DESCRIPTION OF EMBODIMENTS

<Embodiment 1>

Embodiment 1 of the present invention will be described with reference to FIGS. 1 to 7. In the present embodiment, a liquid crystal display device 10 will be described as an example. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 3:
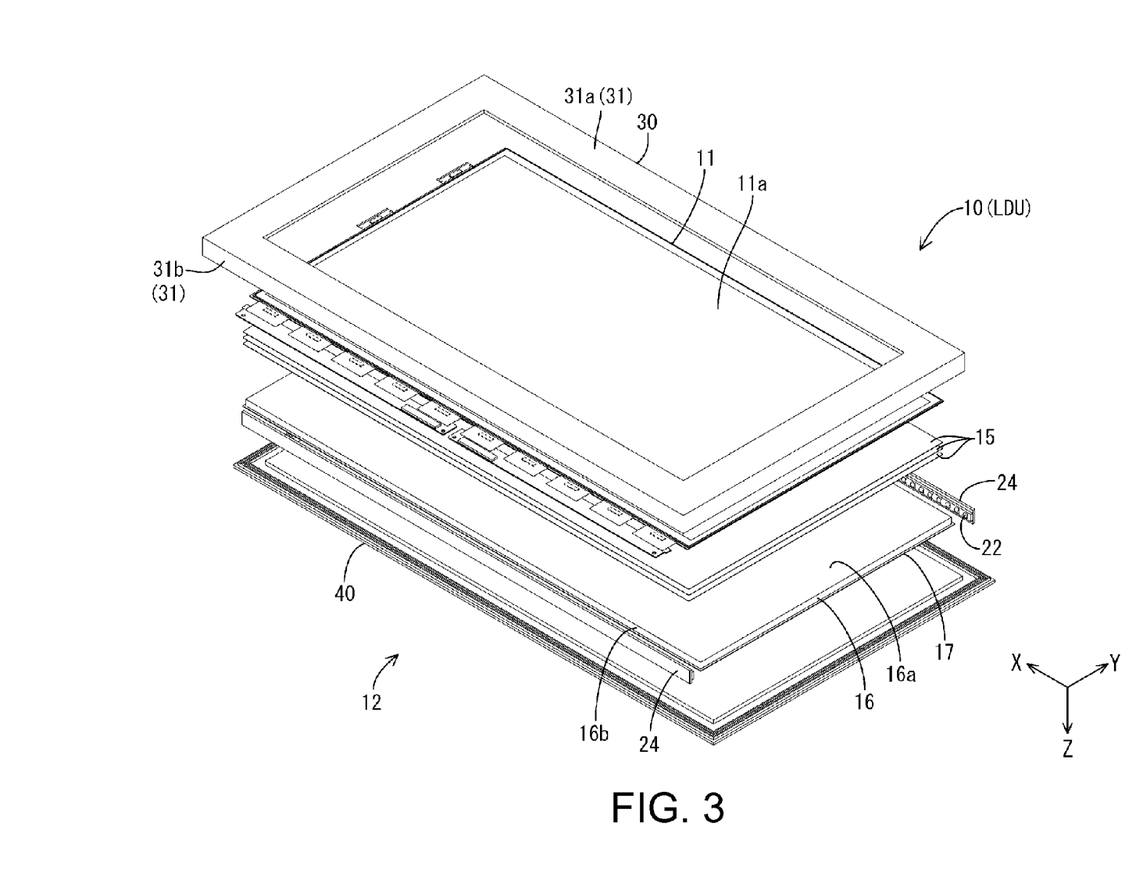
FIG. 3 is an exploded perspective view showing a schematic configuration of a liquid crystal display unit that constitutes a part of the liquid crystal display device.

A television receiver TV is constituted of: a liquid crystal display unit LDU; various types of boards PWB, MB, and CTB attached to the back side (rear side) of the liquid crystal display unit LDU; a cover member CV attached to the back side of the liquid crystal display unit LDU and covering the various types of boards PWB, MB, and CTB; and a stand ST. The stand ST holds the television receiver TV in a state in which the display surface of the liquid crystal display unit LDU is in the vertical direction (Y axis direction). The liquid crystal display device 10 of the present embodiment is the portion excluding the configuration for receiving television signals (such as a tuner part of a main board MB) from the television receiver TV having the above-mentioned configuration. As shown in FIG. 3, the liquid crystal display unit LDU has a horizontally-long quadrilateral shape (rectangular) as a whole, and includes a liquid crystal panel 11, which is a display panel, and a backlight device 12, which is an external light source. These are integrally held together by a frame 30 (frame member) and a chassis 40, which are external members that constitute the exterior of the liquid crystal display device 10. The chassis 40 of the present embodiment is one of the exterior members and is also a part of the backlight device 12.

Figure 1:
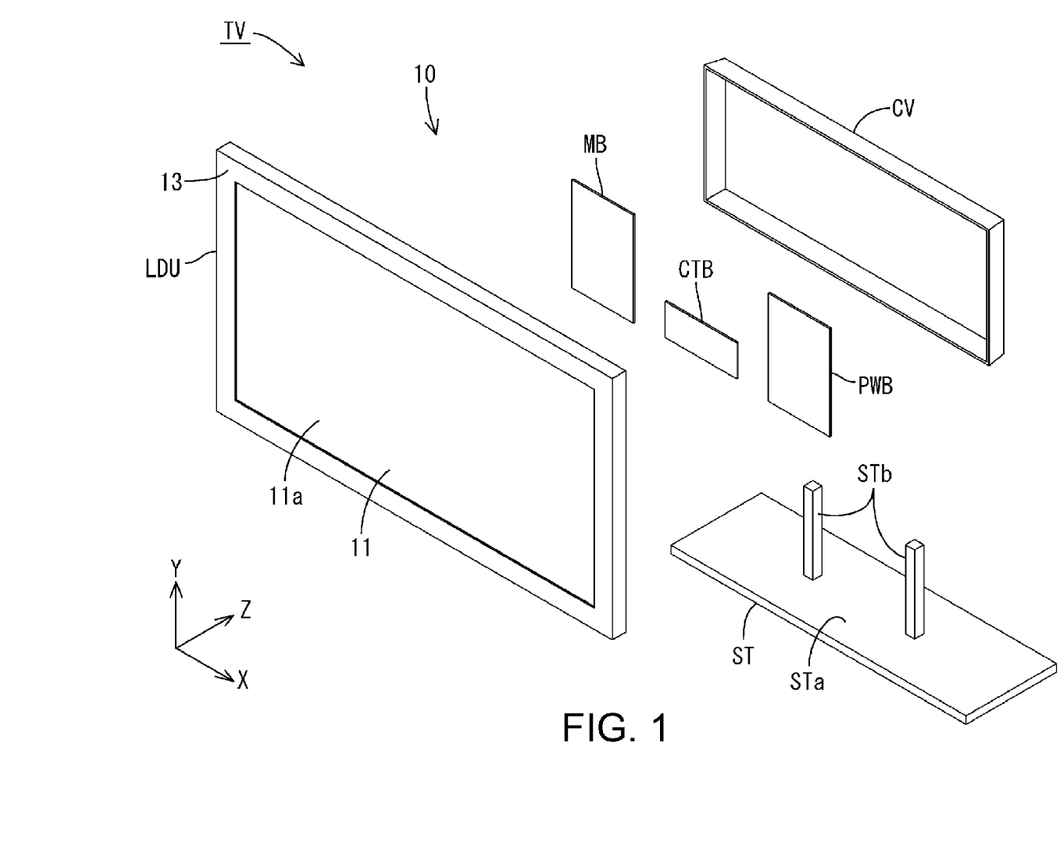
FIG. 1 is an exploded perspective view that shows a schematic configuration of a television receiver and a liquid crystal display device according to Embodiment 1 of the present invention.
Figure 2:
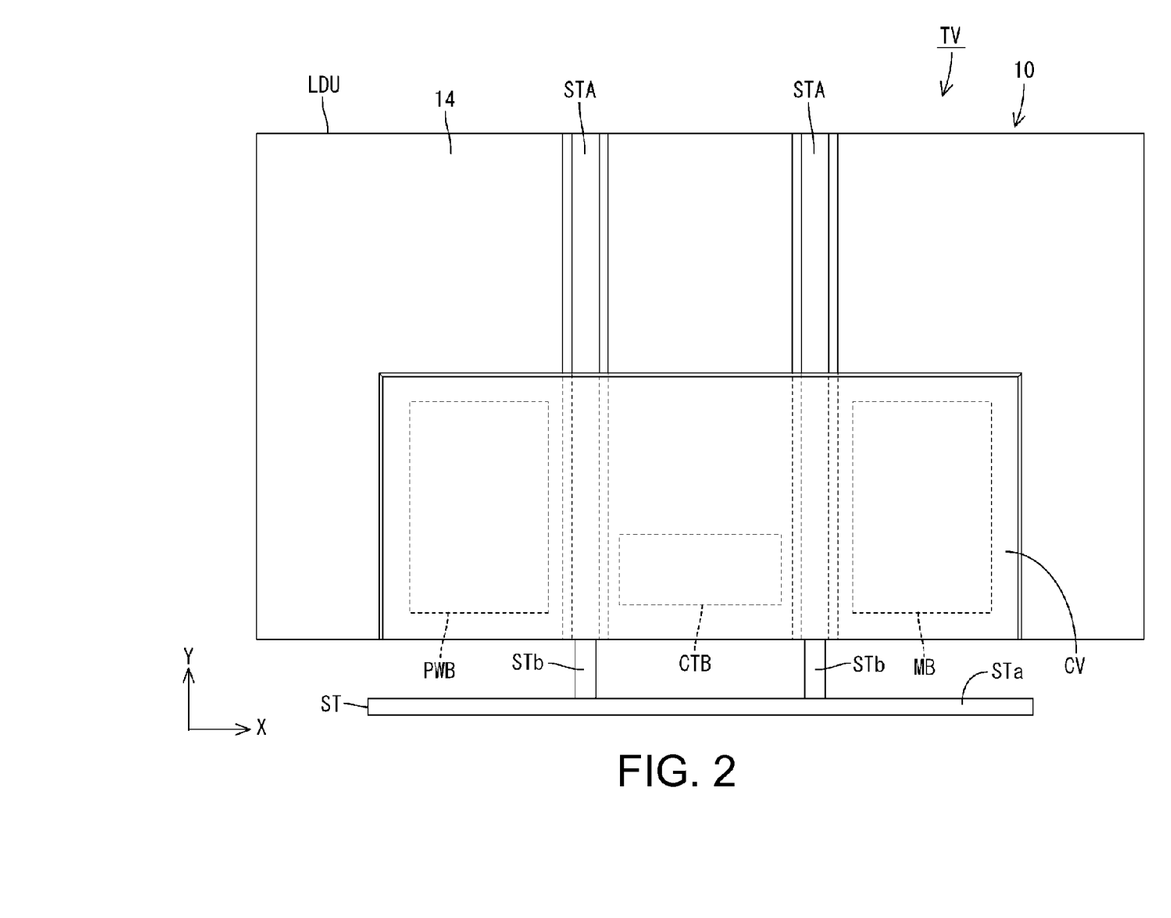
FIG. 2 is a rear view of the television receiver and the liquid crystal display device.

First, the configuration of the rear side of the liquid crystal display device 10 will be explained. As shown in FIG. 2, on the rear of the chassis 40 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 40, and a pair of support columns STb of the stand ST is inserted into respective spaces formed between the stand attachment members STA and the chassis 40, respectively. Wiring members (such as electric wires) connected to an LED substrate 24 of the backlight device 12 run through a space inside of the stand attachment members STA. The stand ST is constituted of a base STa that is disposed in parallel with the X axis direction and the Z axis direction, and the pair of support columns STb standing on the base STa along the Y axis direction. The cover member CV is made of a synthetic resin, and is attached so as to cover approximately a half of the lower part of the rear side of the chassis 40 of FIG. 2, while crossing over the pair of stand attachment members STA along the X axis direction. Between the cover member CV and the chassis 40, a component housing space is provided to house the components mentioned below such as the various boards PWB, MB, and CTB.

As shown in FIG. 2, the various boards PWB, MB, and CTB include a power supply board PWB, the main board MB, and a control board CTB. The power supply board PWB is a power source for the liquid crystal display device 10, and can supply driving power to other boards MB and CTB, LEDs 22 of the backlight device 12, and the like. Therefore, the power supply board PWB doubles as an LED driver board that drives the LEDs 22. The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device that is not shown, an image signal from the video playback device is inputted into the main board MB, and the main board MB can output the image signal to the control board CTB after processing the signal at the image processing part. The control board CTB has the function of converting the image signal inputted from the main board to a signal for driving liquid crystals, and supplying the converted signal for liquid crystal driving to the liquid crystal panel 11.

As shown in FIG. 3, the main constituting components of the liquid crystal display unit LDU, which forms a portion of the liquid crystal display device 10, are housed in a space between the frame 30 that constitutes the front exterior of the liquid crystal display device 10, and the chassis 40 that constitutes the rear exterior. The main constituting components housed between the frame 30 and the chassis 40 include at least the liquid crystal panel 11, optical members 15, a light guide plate 16, and LED units 20. Of these, the liquid crystal panel 11, optical members 15, and light guide plate 16 are held by being sandwiched between the frame 30 on the front side and the chassis 40 on the rear side while being stacked one on top of the other. The backlight device 12 is constituted of the optical members 15, the light guide plate 16, the LED units 20 and the chassis 40, and is the configuration that is obtained by excluding the liquid crystal panel 11 and the frame 30 from the liquid crystal display unit LDU described above. A pair of the LED units LU is disposed between the frame 30 and the chassis 40 so as to be on the respective sides of the light guide plate 16, across from each other in the short side direction (Y axis direction). The LED units 20 each include LEDs 22 that are light sources and an LED substrate 24 where the LEDs 22 are mounted. The respective constituting components will be explained below.

As shown in FIG. 3, the liquid crystal panel 11 is formed in a horizontally-long quadrilateral shape (rectangular) in a plan view, and is configured by bonding a pair of glass substrates having high light transmittance to each other with a prescribed gap therebetween, and by injecting liquid crystals between the two substrates. On one substrate (array substrate), switching elements (TFTs, for example) respectively connected to mutually intersecting source wiring lines and gate wiring lines, pixel electrodes respectively connected to these switching elements, an alignment film, and the like are provided. Provided on the other substrate (CF substrate) are: color filters having colored parts such as R (red), G (green), and B (blue) being arranged in prescribed arrays; an opposite electrode; an alignment film; and the like. The liquid crystal panel 11 is stacked on the front side of the optical members 15 described below, and the rear surface thereof (outer surface of a polarizing plate on the rear side) is in close contact with the optical members 15 with almost no gap therebetween. With this configuration, dust and the like are prevented from entering the space between the liquid crystal panel 11 and the optical members 15. A display surface 11a of the liquid crystal panel 11 is constituted of a display region that is in the center of the surface and that can display images, and a non-display region that is in the outer edges of the surface and that is formed in a frame shape surrounding the display region. The liquid crystal panel 11 is connected to the control board CTB via driver components or a flexible substrate for driving liquid crystal, and an image is displayed in the display area on the display surface 11a thereof on the basis of signals inputted from the control board CTB. Polarizing plates are respectively provided on outer sides of the two substrates. A portion of the frame 30 surface facing the liquid crystal panel 11 has elastic members 36 and 37 having elastic characteristics arranged thereon (see FIG. 6).

As shown in FIG. 3, the optical members 15 have a horizontally-long quadrilateral shape in a plan view as in the liquid crystal panel 11, and the size thereof (short side dimension and longer side dimension) is similar to that of the liquid crystal panel 11. The optical members 15 are stacked on the front side (side from which light is emitted) of the light guide plate 16 described below, and are sandwiched between the liquid crystal panel 11 described above and the light guide plate 16. Each of the optical members 15 is a sheet-shaped member, and the optical members 15 are constituted of three sheets stacked together. Specific types of optical members 15 include a diffusion sheet, a lens sheet, a reflective polarizing sheet, and the like, for example, and it is possible to appropriately choose any of these as the optical member 15.

Figure 4:
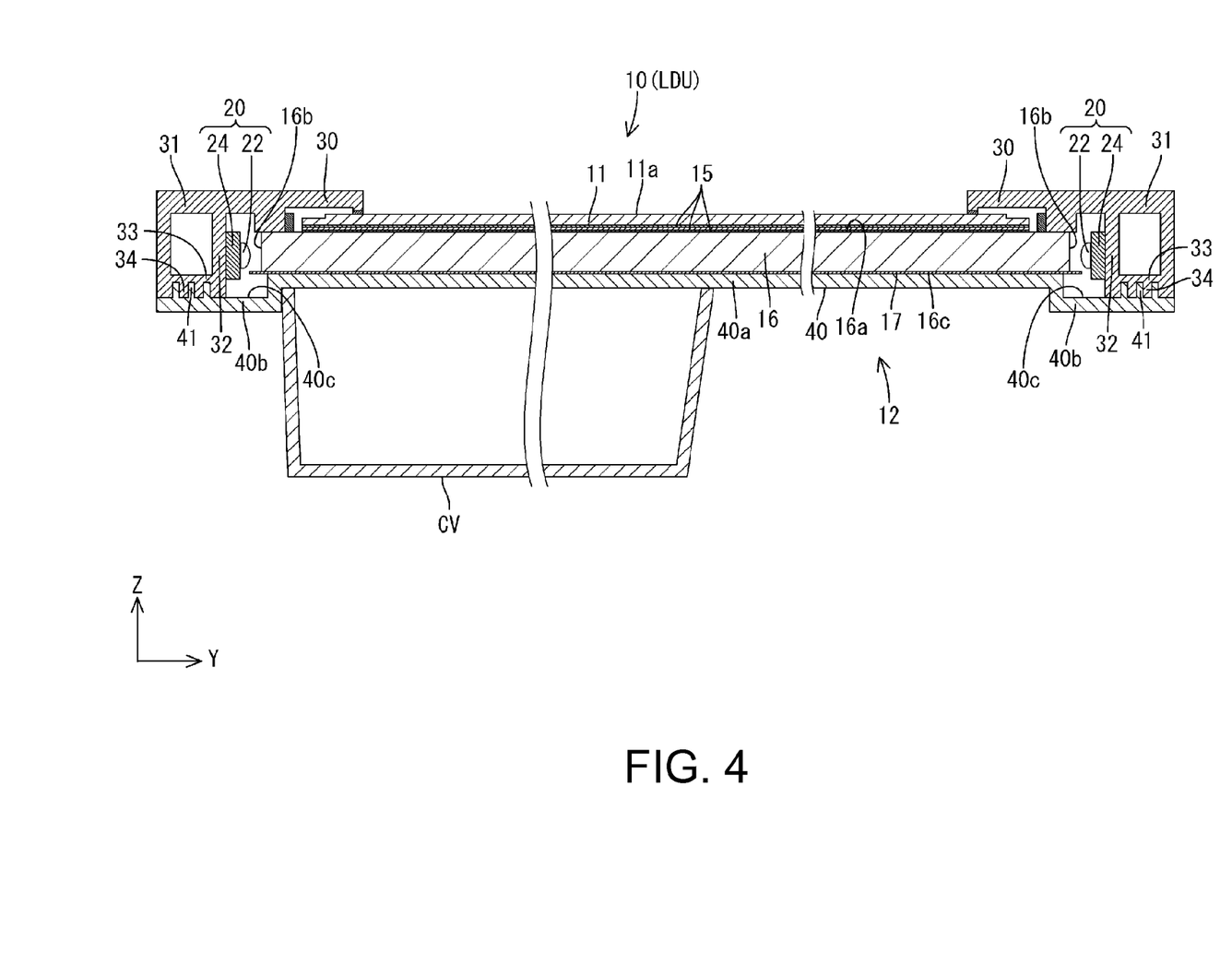
FIG. 4 is a cross-sectional view that shows a cross-sectional configuration of the liquid crystal display device along the short side direction.

The light guide plate 16 is made of a synthetic resin (an acrylic resin such as PMMA or a polycarbonate, for example) with a higher refractive index than air and almost completely transparent (excellent light transmission). As shown in FIG. 3, the light guide plate 16 has a horizontally-long quadrilateral shape in a plan view, in a manner similar to the liquid crystal panel 11 and the optical members 15, and has a plate shape that is thicker than the optical members 15. The long side direction on the main surface of the light guide plate corresponds to the X axis direction, the short side corresponds to the Y axis direction, and the plate thickness direction intersecting the main surface corresponds to the Z axis direction. The light guide plate 16 is placed on the rear side of the optical members 15, and is sandwiched between the optical members 15 and the chassis 40. As shown in FIG. 4, in the light guide plate 16, at least the short side dimensions thereof are greater than the respective short side dimensions of the liquid crystal panel 11 and the optical members 15, and the light guide plate 16 is disposed such that respective edges in the short side direction (respective edges along the long side direction) protrude outward beyond respective edges of the liquid crystal panel 11 and the optical members 15 (so as not to overlap in a plan view). The light guide plate 16 is sandwiched in the Y axis direction between the pair of LED units 20 disposed on both edges of the light guide plate 16 facing each other in the short side direction thereof. Light from the LEDs 22 enters both respective edges positioned with respect to each other in the short side direction. The light guide plate 16 has the function of guiding therethrough light from the LEDs 22 that entered from the respective edges facing each other in the short side direction, internally propagating this light, and emitting the light toward the optical members 15 (front side).

Of the main surfaces of the light guide plate 16, the surface facing the front side (facing the optical members 15) is a light exiting surface 16a where internal light exits towards the optical members 15 and the liquid crystal panel 11. Of the peripheral end faces adjacent to the main surface of the light guide plate 16, both end faces of the light guide plate 16 in the long side direction along the X axis (both end faces of the respective edges in the short side direction) are light receiving faces 16b (side face of the light guide plate 16) that directly face the respective LEDs 17 (LED substrates 24) with prescribed gaps therebetween and that receive light emitted from the LEDs 22. The light receiving faces 16b are on a plane parallel to that defined by the X axis direction and the Z axis direction (main surface of the LED substrate 24), and are substantially perpendicular to the light exiting surface 16a. The direction along which the LEDs 22 and the light receiving faces 16b are aligned with respect to each other is the same as the Y axis direction, and is parallel to the light emitting surface 16a.

As shown in FIG. 4, a reflective sheet 20 is provided on the rear side of the light guide plate 16, or namely, on a surface 16c opposite to the light exiting surface 16a (the surface facing the chassis 40). This reflective sheet 17 covers almost an entire surface 16c and can reflect light that exits to the rear side back towards the front side. In other words, the reflective sheet 17 is sandwiched between the chassis 40 and the light guide plate 16. The reflective sheet 17 is made of a synthetic resin, and the surface thereof is a highly reflective white. The short side dimension of the reflective sheet 17 is greater than the short side dimension of the light guide plate 16, and the respective edges thereof protrude beyond the light receiving faces 16b toward the LEDs 22. With the protruding portions of the reflective sheet 17, light that travels diagonally from the LEDs 22 towards the chassis 40 can be reflected efficiently, thereby directing the light toward the light receiving faces 16b of the light guide plate 16. On at least one of the light exiting surface 16a and the surface 16c opposite thereto in the light guide plate 16, reflective parts (not shown) that reflect internal light or diffusion parts (not shown) that diffuse internal light are patterned so as to have a prescribed distribution in the horizontal direction, thereby controlling the light emitted from the light exiting surface 16a to have an even distribution in the horizontal direction.

The pair of LED units 20 are respectively constituted of the LED substrates 24 and the LEDs 22. The LED substrate 24 has a surface that is perpendicular to the bottom plate of the chassis 40 and that faces the light-receiving face 16b of the light guide plate 16 while extending in the long side direction of the chassis 40. One surface of the LED substrate 24 has LEDs 22, which emit white light, mounted so as to be aligned in a row. The LED substrate 24 is attached to the frame 30 such that the other surface thereof is in surface-to-surface contact with the frame 30. The LEDs 22 may have a configuration in which white light is emitted by having a blue light emitting element coated with a fluorescent material that has a light emitting peak in the yellow region. The LEDs 22 may alternatively have a configuration in which white light is emitted by having a blue light emitting element coated with fluorescent materials that have light emitting peaks in the green region and the red region, respectively. The LEDs 22 may also have a configuration in which white light is emitted by having a blue light emitting element coated with a fluorescent material that has a light emitting peak in the green region, and combining this with a red light emitting element. The LEDs 22 may also have a configuration in which white light is emitted by combining a blue light emitting element, a green light emitting element, and a red light emitting element. The LEDs 22 may also be a combination of an ultraviolet light emitting element with fluorescent materials. In particular, the LEDs 22 may have a configuration in which white light is emitted by having the ultraviolet light emitting element coated with fluorescent materials that have light emitting peaks in the blue, green, and red regions, respectively.

Next, the configuration of the frame 30 and the chassis 40 will be explained. The frame 30 and the chassis 40 are both made of a metal such as aluminum, for example, and have higher mechanical strength (rigidity) and heat conductivity compared to a case in which the frame 30 and the chassis 40 are made of a synthetic resin. Thus, the materials forming the frame 30 and the chassis 40 can be said to be light shielding materials with light shielding characteristics. As shown in FIG. 3, the frame 30 and the chassis 40 respectively house a pair of LED units 20 in which respective LED units 20 are on opposing edges (both long side edges) in the short side direction of the frame 30 and the chassis 40, the frame 30 and the chassis 40 sandwiching and thereby holding the liquid crystal panel 11, the optical members 15, and the light guide plate 16 from the front side and the rear side.

Figure 5:
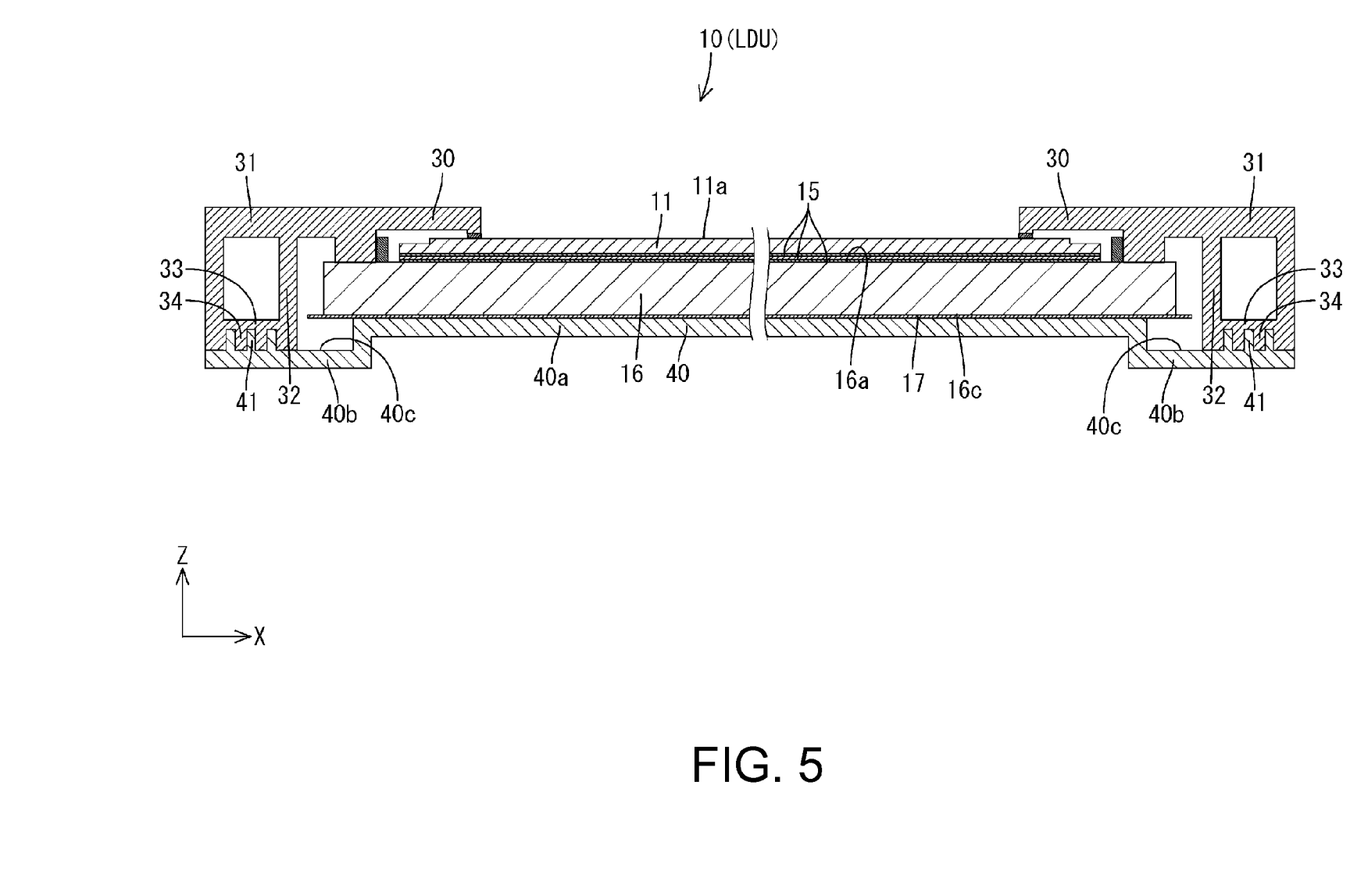
FIG. 5 is a cross-sectional view that shows a cross-sectional configuration of a liquid crystal display device along the long side direction.

As shown in FIG. 3, the frame 30 is formed in a horizontally-long frame shape as a whole so as to surround the display region of the display surface 11a of the liquid crystal panel 11. As shown in FIGS. 4 and 5, the frame 30 has an L shape in a cross-sectional view, and includes an exterior member 31 that forms the exterior of the liquid crystal display device 10, a light attaching portion 32 to which the LEDs 22 are attached, and a chassis abutting portion 33 that is integrally formed with the exterior member 31 and the light source attachment section 32 and that abuts the chassis 40. According to this type of configuration, a portion of the exterior member 31 of the frame 30 is connected to the light source attachment section 32 and the chassis abutting portion 33 to form a square tube shape. The exterior member 31 is disposed in parallel with the display surface 11a of the liquid crystal panel 11 and has a panel pressing portion 31a that presses the liquid crystal panel 11 from the front side thereof and a side wall 31b that protrudes from the periphery of the panel pressing portion 31a towards the rear side.

The panel pressing portion 31a is formed in a horizontally-long frame shape similar to the outer edge portion (non-display region, frame portion) of the liquid crystal panel 11, and can press almost the entire outer edge portion of the liquid crystal panel 11 from the front side. The panel pressing portion 31a is made wide enough to cover the optical members 15 and the outer edges of the light guide plate 16 that are located outside of the respective longer sides of the liquid crystal panel 11 in the light radiating direction, and the respective LED units 20 from the front side, in addition to the outer edges of the liquid crystal panel 11. The front outer surface of the panel pressing portion 31a (surface opposite to the side facing the liquid crystal panel 11) is exposed to the outside on the front side of the liquid crystal display device 10 as in the display surface 11a of the liquid crystal panel 11, and constitutes the front side of the liquid crystal display device 10 together with the display surface 11a of the liquid crystal panel 11. On the other hand, the side walls 31b take the form of a substantially plate shape that protrudes from the periphery (specifically, outer edges) of the panel pressing portion 13a toward the rear side. The side walls 31b can enclose the liquid crystal panel 11, the optical members 15, the light guide plate 16, and the LED units LU that are housed therein along almost the entire periphery thereof, and also can enclose the chassis 40 on the rear side along almost the entire periphery thereof. The outer surfaces of the side walls 13b along the circumferential direction of the liquid crystal display device 10 are exposed to the outside in the circumferential direction of the liquid crystal display device 10, and constitute the top face, the bottom face, and the side faces of the liquid crystal display device 10.

Figure 6:
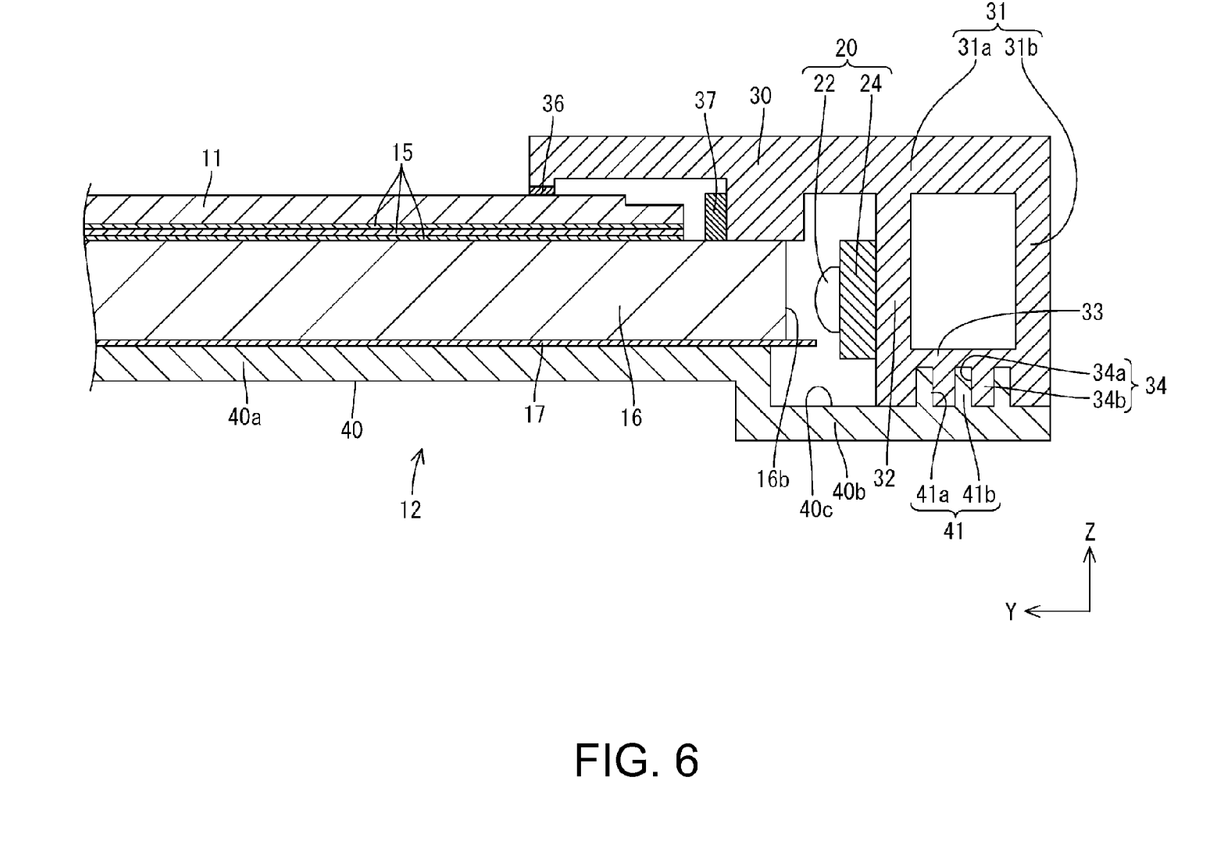
FIG. 6 is a magnified cross-sectional view of a liquid crystal display device along a short side direction showing recesses and protrusions of the frame and recesses and protrusions of the chassis.

As shown in FIG. 6, the light source attachment section 32 is provided on a portion of the panel pressing portion 31a farther inward than the side wall 31b (towards the light guide plate 16). The light source attachment section 32 protrudes from the inner surface of the panel pressing portion 31a towards the rear side along the Z axis direction, and are each formed in a substantially plate shape that is horizontally long and that extends along the respective sides of the panel pressing portion 31a (X axis direction or Y axis direction). When the liquid crystal display device 10 is assembled, the light source attachment section 32 is disposed so as to face the light receiving face 16b of the light guide plate 16, and the LEDs 22 (LED unit 20) are attached to the surface of the light source attachment section 32 of the light guide plate 16 side. The light source attachment sections 32 are respectively provided on each side of the panel pressing portion 31a, and each light source attachment section 32 has the same length as the entire length of each side of the panel pressing portion 31a. In the present embodiment, a light source is attached to the light source attachment section 32 on the long side of the frame 30, but a light source is not attached to the light source attachment section 32 on the short side.

As shown in FIG. 6, the chassis abutting portion 33 is disposed to connect the light source attachment section 32 and an end of the side wall 31b opposite to the panel pressing portion 31a so as to be adjacent to the light source attachment section 32. The chassis abutting portion 33 faces the panel pressing portion 31a and has a substantially plate shape that is horizontally long. On the surface of the chassis abutting portion 33 facing the chassis 40 (surface opposite the panel pressing portion 31a), frame side recesses and protrusions that will be mentioned later are provided. According to this type of configuration, the light source attachment section 32 and the chassis abutting portion 33 are disposed between the LEDs 22 and the chassis 40.

The frame 30 having the configuration mentioned above is formed by assembling four segmented frames that are segmented at the respective sides (respective longer side portions and short side portions). As a result, the manufacturing cost can be reduced if it is possible to adopt a manufacturing method in which each segmented frame is manufactured by extrusion of a metal compared to manufacturing the frame 30 by machining a metal. The adjacent long side segmented frames and the short side segmented frames form the frame 30 by being connected at respective edges in the respective extension directions of the segmented frames. The exterior member 31, the light source attachment section 32, and the chassis abutting portion 33 respectively form a frame shape along the entire periphery.

Figure 7:
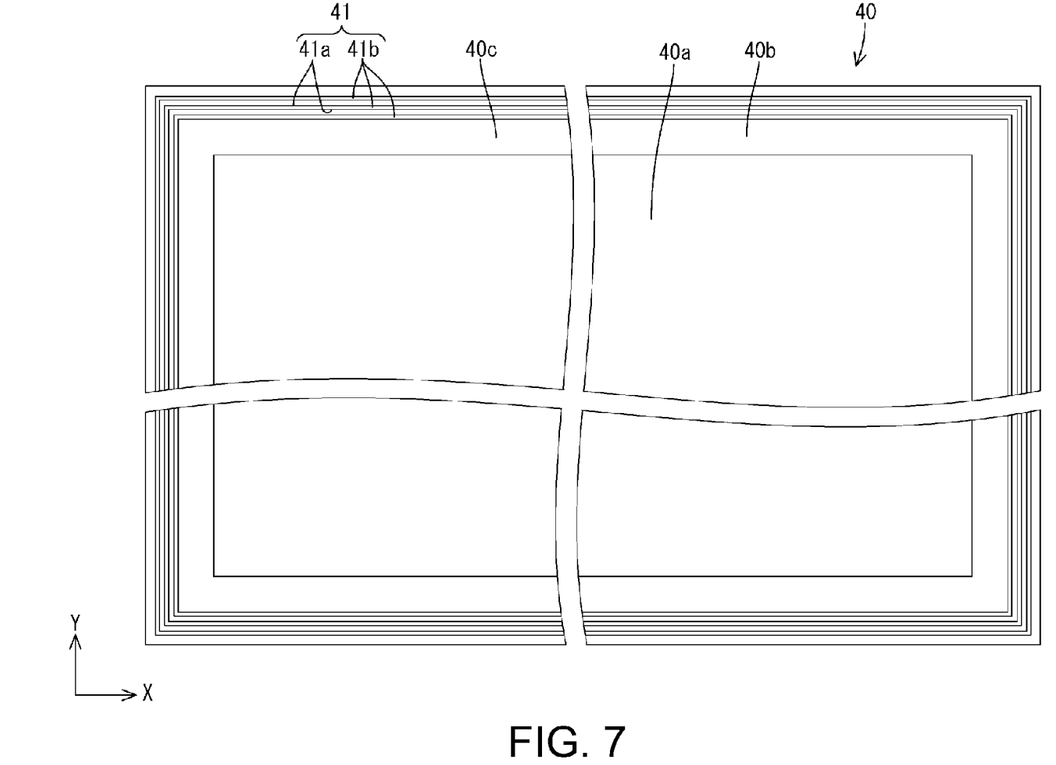
FIG. 7 is a magnified front view showing the periphery of the chassis.

As shown in FIG. 3, the chassis 40 is formed in a substantially shallow plate shape that is horizontally long as a whole so as to almost entirely cover the light guide plate 16, the LED units 20, and the like from the rear side. As shown in FIG. 3, the chassis 40 has a plate surface 40c facing the front side (plate surface on the light guide plate 16 side) that opposes the light guide plate 16, and the plate surface of the chassis 40 facing the rear side is exposed to the outside on the rear side of the liquid crystal display device 10, and constitutes the rear surface of the liquid crystal display device 10. As shown in FIG. 7, the chassis 40 has a bottom plate portion 40a having a horizontally-long quadrilateral shape similar to the light guide plate 16, and a light source housing portion 40b having edge portions that respectively are recessed so as to form a step at the rear side. The light source housing portion 40b also houses the LED units 20 and wiring lines (not shown) that are connected to the LED units.

As shown in FIGS. 4 and 5, the bottom plate 40 is formed in a plate shape that can receive the rear side of a large center portion (which does not include the respective longer side edges) of the light guide plate 16, or in other words, the bottom plate 40a constitutes a receiving portion for the light guide plate 16.

As shown in FIG. 7, the light source housing portion 40b is formed along the entire periphery of the outer edges of the bottom plate portion 40a, and the inner surface thereof (plate surface 40c facing the light guide plate 16) is provided with the recesses and protrusions 41 of the chassis mentioned later.

Next, the configurations of the recesses and protrusions 41 of the chassis and the recesses and protrusions 34 of the frame, which are the main components of the present embodiment, along with the assembling state of the frame 30 and the chassis 40 will be described.

FIG. 6 is a cross-sectional view of the main parts of the liquid crystal display device 10, showing a magnified cross-sectional view of a portion near one of the recesses and protrusions 41 of the chassis and the recesses and protrusions 34 of the frame shown in FIG. 4. Descriptions of the configuration of the recesses and protrusions 41 of the chassis and the recesses and protrusions 34 of the frame on the other side in FIG. 4, and the configuration of the recesses and protrusions 41 of the chassis and the recesses and protrusions 34 of the frame in FIG. 5 are omitted because the respective configurations are the same.

As shown in FIG. 6, in the light source housing portion 40b of the chassis 40, the recesses and protrusions 41 of the chassis include recesses 41a and protrusions 41b that are aligned along the plate surface direction of the chassis 40 (Y axis direction) on the plate surface 40c facing the light guide plate 16. The respective recesses 41a and the protrusions 41b extend along the edge portion of the chassis 40. As shown in FIG. 7, the recesses and protrusions 41 of the chassis are provided along the entire periphery of the outside edges of the chassis 40. In other words, the respective recesses 41a and protrusions 41b extend along a frame shape formed by connecting an extending portion that extends along the long side direction of the chassis 40 shown in FIG. 4 to an extending portion that extends along the short side direction of the chassis 40.

The protrusions 41b are a plurality of ribs (three in this embodiment) that protrude from the plate surface 40c of the chassis 40 facing the light guide plate 16. The protrusions 41b have a rectangular shape in a cross-sectional view, and the side face thereof extends in a direction perpendicular to the plate surface 40c of the chassis 40. The recesses 41a are formed in a U-shape in a cross-sectional view by side faces of adjacent protrusions 41b and the plate surface 40c of the chassis 40.

As shown in FIGS. 4 and 5, the recesses and protrusions 34 of the frame are configured to be able to engage with the recesses and protrusions 41 of the chassis. Specifically, the recesses and protrusions 34 of the frame have grooves 34a (three in the present embodiment) that are recessed from the surface of the chassis abutting portion 33 facing the chassis 40 to match the outer shape of the protrusions of the recesses and protrusions 41 of the chassis. If the frame 30 is formed by extrusion, the grooves 34a extend along the direction of extrusion, thereby allowing the recesses and protrusions of the frame to be formed with ease.

As shown in FIG. 6, the grooves 34a are formed in a U-shape in a cross-sectional view, and the inner side face thereof extends perpendicular to the surface of the chassis abutting portion 33. Projections 34b are formed in a rectangular shape in a cross-sectional view by inner side faces of grooves 34a that are adjacent to each other, and the surface of the chassis abutting portion 33.

Next, the assembled state of the frame 30 and the chassis 40 is explained. The liquid crystal display device 10 is manufactured by assembling together respective constituting components that are manufactured separately (frame 30, chassis 40, liquid crystal panel 11, optical members 15, light guide plate 16, LED units 20, and the like). In the assembly process, the respective constituting components are assembled after being flipped over with respect to the Z axis direction from the position shown in FIGS. 4 and 5. First, the frame 30 among the constituting components is set on a work table such that the rear side surface thereof faces up in the vertical direction. The frame 30 is formed into a frame shape as a whole by connecting four segmented frames 30S.

A pair of the LED units 20 is attached to a portion of the light source attachment section 32 of the frame 30 extending along the long side direction. The LED unit 20 is attached to the light source attachment section 32 using a known method such as fixing with screws or the like, for example.

Next, the liquid crystal panel 11 is assembled to the frame 30, and the respective optical members 15, the light guide plate 16, the reflective sheet 17 are directly stacked onto the rear surface of the liquid crystal panel in that order.

After the LED unit 20, the liquid crystal panel 11, the optical members 15, and the light guide plate 16 are assembled together, the process of attaching the chassis 40 takes place. The chassis 40 is attached to the frame 30 in a state in which the plate surface 40c faces downwards in the vertical direction. At this time, the chassis 40 abuts the chassis abutting portion 33 of the frame 30 such that the recesses and protrusions 41 of the chassis engage the recesses and protrusions 34 of the frame. Then, the chassis 40 is attached to the frame 30 using a known method such as fixing with screws or the like, for example.

The assembly of the liquid crystal display unit LDU is completed in the manner described above. Next, after the stand attachment member STA and various boards PWB, MB, and CTB are attached to the rear side of the liquid crystal display unit LDU, the stand ST and the cover member CV are attached to the rear side, thereby completing the liquid crystal display device 10 and the television receiver TV. In the liquid crystal display device 10 manufactured in this manner, the exterior thereof is constituted of the frame 30 that presses the liquid crystal panel 11 from the display surface 11a side, and the chassis 40 of the backlight device 12, and the liquid crystal panel 11 is directly stacked on the optical members 15. Therefore, compared to a conventional configuration in which a cabinet made of a synthetic resin is provided in addition to the frame 30 and the chassis 40, or in which a panel receiving member is provided between the liquid crystal panel 11 and the optical members 15 so as to keep the two from making contact with each other, the number of parts and the assembly steps can be reduced, resulting in a lower manufacturing cost, and the size and weight reduction.

If the power source of the liquid crystal display device 10 that is manufactured in the above manner is turned ON, then various types of signals are supplied from the control substrate CTB to the liquid crystal panel 11 to control the driving thereof, and the respective LEDs 22 forming the backlight device 12 are turned ON. By passing through the optical members 15 after being guided by the light guide plate 16, light from the respective LEDs 22 is converted to an even planar light, which then illuminates the liquid crystal panel 11, and a prescribed image is displayed on the liquid crystal panel 11.

When the respective LEDs 22 are lit in order to use the liquid crystal display device 10, heat is generated from the respective LEDs 22. Heat generated from the respective LEDs 22 is first transferred to the LED substrate 24 and then to the light source attachment section 32 of the frame 30. In the frame 30, the heat is transferred from the light source attachment section 32 to the exterior member 31 and the chassis abutting portion 33. Next, the heat is transferred from the chassis abutting portion 33 to the chassis 40 and then efficiently dissipated outside from the chassis 40, and thus, heat is less likely to be trapped inside the frame 30. At this time, the recesses and protrusions 34 of the frame 30 engage the recesses and protrusions 41 of the chassis 40, and therefore, compared to a case in which recesses and protrusions of the frame and the chassis are not provided, the area of contact between the frame 30 and the chassis 40 is greater. As a result, the configuration allows heat to be transferred from the frame 30 to the chassis 40 efficiently. In particular, because the frame 30 of the present embodiment is made of metal in order to attain sufficient mechanical strength, the frame 30 has excellent heat conductivity, and therefore, heat can be efficiently transferred to the chassis 40. Furthermore, because the chassis 40 is made of metal in order to attain sufficient mechanical strength in a similar manner to the frame 30, the heat conductivity thereof is excellent, and because the area exposed outside is greater than that of the frame 30, the heat from the LEDs 22 can be efficiently dissipated and high heat dissipating properties are attained.

As explained above, the liquid crystal display device 10 (display device) of the present embodiment is provided with: LEDs 22 (light source); a liquid crystal panel 11 (display panel) that performs display using light from the LEDs 22; a light guide plate 16 arranged to overlap a side of the liquid crystal panel 11 (display panel) opposite to a display surface thereof, the light guide plate 16 having a light receiving face 16b facing the LEDs 22; a chassis 40 disposed on a side of the light guide plate 16 opposite to the liquid crystal panel 11, the chassis 40 having a plate shape with recesses and protrusions aligned on a surface thereof facing the light guide plate 16 side; and a frame 30 disposed on the display surface side of the liquid crystal panel 11, the frame 30 (frame member) and the chassis 40 housing therebetween the LEDs 22, the liquid crystal panel 11, and the light guide plate 16, the frame 30 having the LEDs 22 attached thereto and having recesses and protrusions 34 that can engage the recesses and the protrusions 41 of the chassis, the recesses and the protrusions 34 of the frame engaging the recesses and the protrusions 41 of the chassis.

According to the present embodiment, the recesses and protrusions 34 of the frame engage the recesses and protrusions 41 of the chassis, and therefore, the area of contact between the frame 30 and the chassis 40 can be expanded. Thus, the heat generated by the LEDs 22 and transferred to the frame 30 can be efficiently transferred from the recesses and protrusions 34 of the frame to the recesses and protrusions 41 of the chassis. The heat transferred from the recesses and protrusions 41 of the chassis to the entire chassis 40 can be dissipated from the chassis 40 having a plate shape. As a result, compared to a display device that does not have recesses and protrusions in the frame and the chassis, the temperature of the frame 30 can be made low, making the configuration suitable for safety for when a user directly touches the frame member. Furthermore, a decrease in the lifespan of the LEDs 22 due to the temperature of the frame 30 becoming high can be suppressed.

Furthermore, in the present embodiment, the chassis 40 has recesses 41a and protrusions 41b that extend along the edge portion of the chassis 40. Thus, the rigidity of the chassis 40 can be increased in the direction along the edge portion of the chassis 40.

Furthermore, in the present embodiment, the chassis 40 has recesses and protrusions 41 provided along the entire periphery of the outside edges of the chassis 40. As a result, the flatness of the plate surface of the chassis 40 can be increased.

In the present embodiment, the protrusions 41b are a plurality of ribs that protrude from the plate surface 40c on the light guide plate 16 side of the chassis 40. Therefore, the recesses and protrusions 41 of the chassis can be provided with ease.

Furthermore, in the frame 30 of the present embodiment, the chassis abutting portion 33 is adjacent to the light source attachment section 32, and thus, the heat transferred from the LEDs 22 to the light source attachment section 32 can be efficiently transferred to the chassis abutting portion 33.

In the present embodiment, the frame 30 has the exterior member 31 separate from the light source attachment section 32 and the chassis abutting portion 33, and in particular, the exterior member 31, which is likely to come into direct contact with a user, is unlikely to reach high temperatures, and thus, safety for when the user touches the frame 30 is further improved.

In the present embodiment, the LEDs 22 are attached to the frame 30 through the LED substrate 24. Therefore, heat from the LEDs 22 can be transferred from the LED substrate 24, which generally has an excellent heat conductivity, to the frame 30. Thus, the heat from the LEDs 22 can be transferred to the frame 30 with greater ease.

In the present embodiment, because the light source is white light-emitting diodes, the light source can be made to have low power consumption and have an even longer lifespan.

<Embodiment 2>

Figure 8:
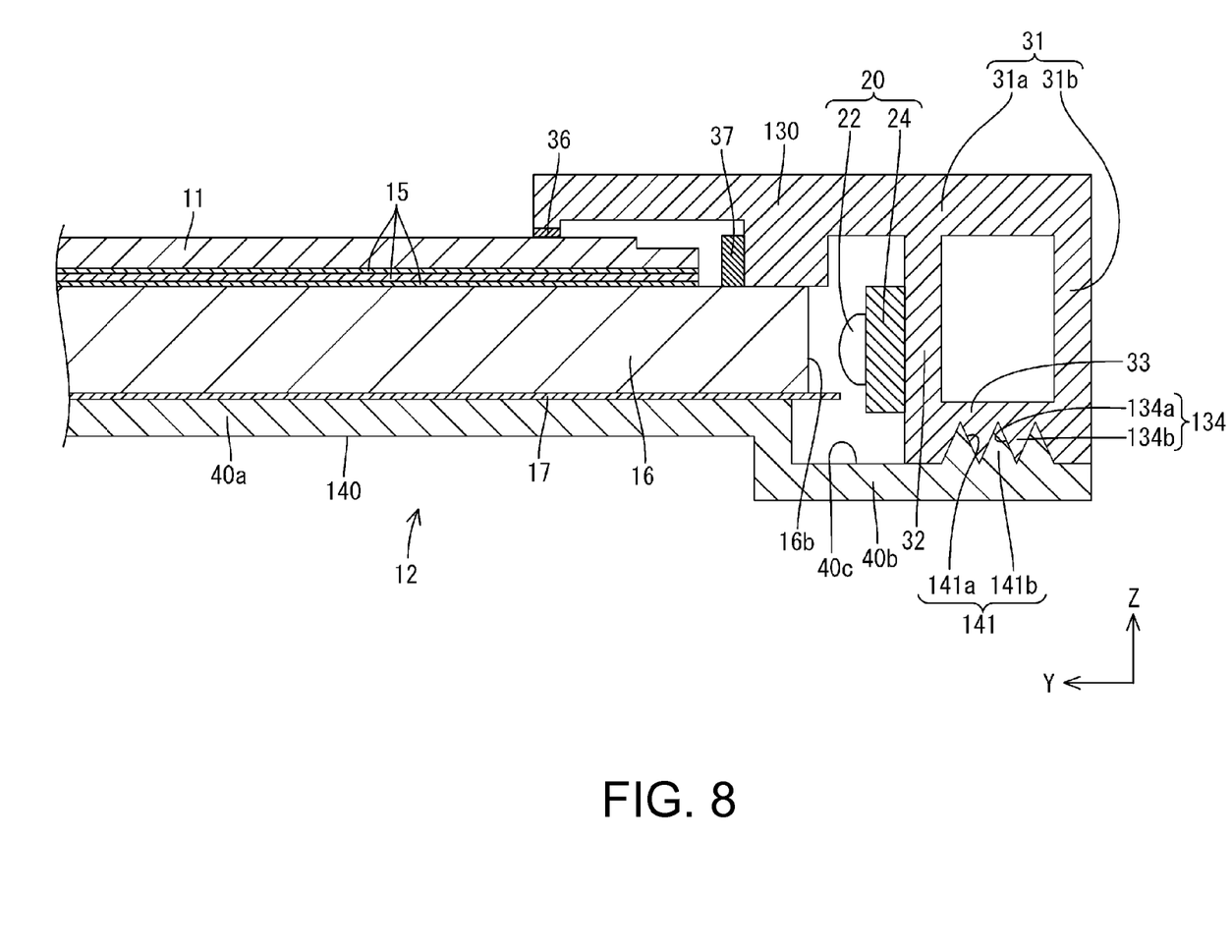
FIG. 8 is a magnified cross-sectional view that shows a cross-sectional configuration of the liquid crystal display device according to Embodiment 2 of the present invention along the short side direction showing recesses and protrusions of the frame and recesses and protrusions of the chassis.

Embodiment 2 of the present invention will be described with reference to FIG. 8. Embodiment 2 is different from the embodiment mentioned above in that Embodiment 2 has a chassis 140 having recesses and protrusions 141 with a different shape and a frame 130 having recesses and protrusions 134 that can engage recesses and protrusions 141 of the frame. Descriptions of structures, operations, and effects similar to those of the embodiment described above will be omitted.

Protrusions 141b among the recesses and protrusions 141 of the chassis are a plurality of ribs (three in the present embodiment) protruding from the plate surface 40c of the chassis 140 facing the light guide plate 16. The protrusions 141b have a triangular shape in a cross-sectional view and a side face thereof has an acute angle to the plate surface 40c of the chassis 140. Therefore, the recesses 141a are formed in a V shape in a cross-sectional view by the side faces of the protrusions 141b adjacent to each other. In other words, the recesses and protrusions 141 of the chassis form a saw-tooth shape in a cross-sectional view.

The recesses and protrusions 134 of the frame have grooves 134a that are formed in a V shape in a cross-sectional view. Inner surfaces of the grooves 134a adjacent to each other form the protrusions 134b having a triangular shape in a cross-sectional view. In other words, the recesses and protrusions 134 of the frame have a saw-tooth shape in a cross-sectional view.

According to the present embodiment, the recesses and protrusions 141 of the chassis and the recesses and protrusions 134 of the frame have saw-tooth shapes in a cross-sectional view, and the protrusions 141b among the recesses and protrusions 141 of the chassis can engage the grooves 134a of the recesses and protrusions 134 of the frame with ease, and thus, the frame 130 can be attached to the chassis 140 with ease.

<Embodiment 3>

Figure 9:
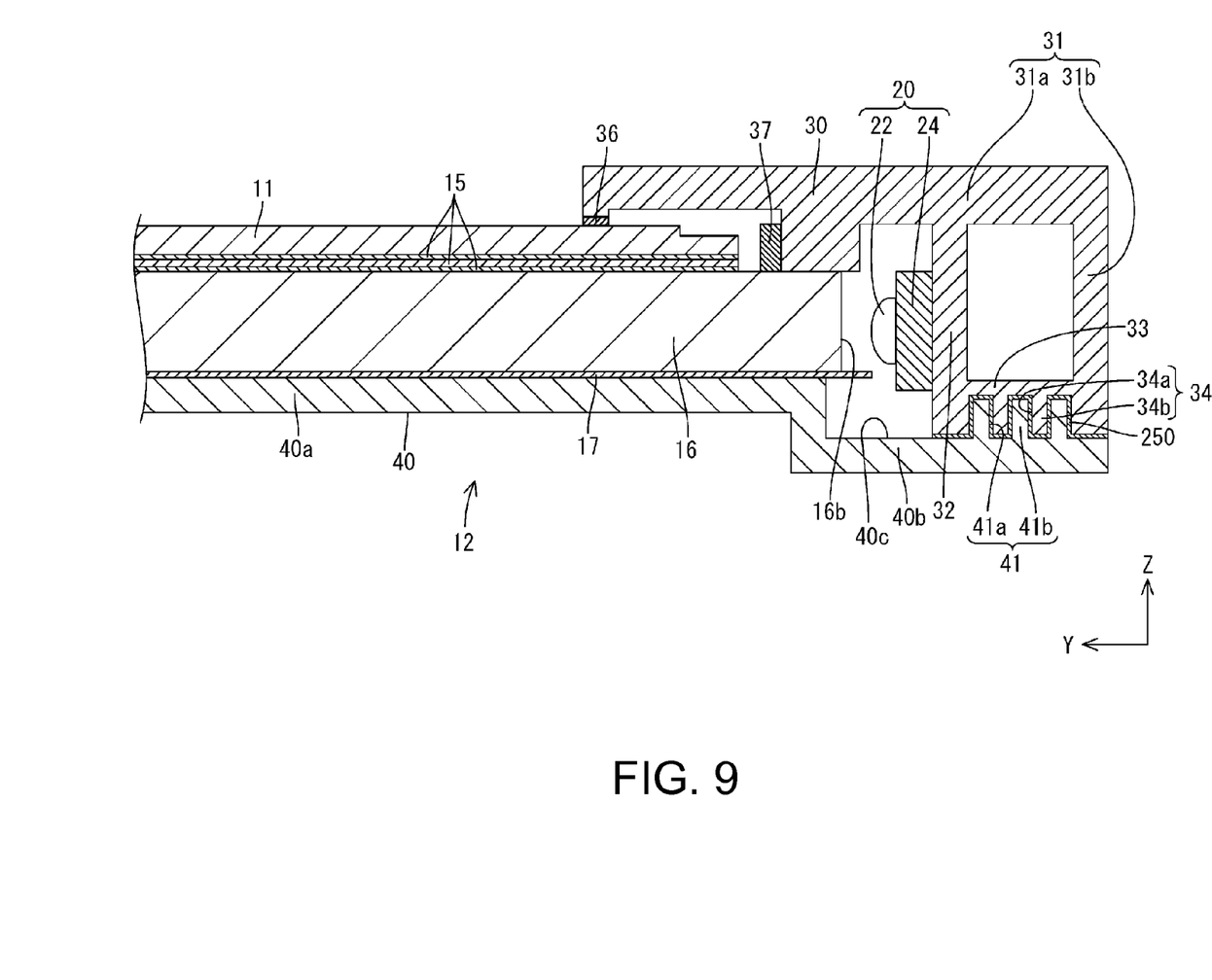
FIG. 9 is a magnified cross-sectional view that shows a cross-sectional configuration of the liquid crystal display device according to Embodiment 3 of the present invention along the short side direction showing recesses and protrusions of the frame and recesses and protrusions of the chassis.

Embodiment 3 of the present invention will be described with reference to FIG. 9. Embodiment 3 is different from the respective embodiments mentioned above in that the recesses and protrusions 41 of the chassis and the recesses and protrusions of the frame have thermal grease 250 therebetween. Descriptions of structures, operations, and effects similar to those of the embodiments described above will be omitted.

In the liquid crystal display device 10 related to Embodiment 3, the thermal grease 250 having heat dissipating characteristics is provided between the recesses and protrusions 34 of the frame and the recesses and protrusions 41 of the chassis. As a result, heat is transferred from the recesses and protrusions 34 of the frame to the recesses and protrusions 41 of the chassis with greater ease due to the thermal grease 250, and thus, the temperature of the frame 30 can be made even lower.

<Embodiment 4>

Figure 10:
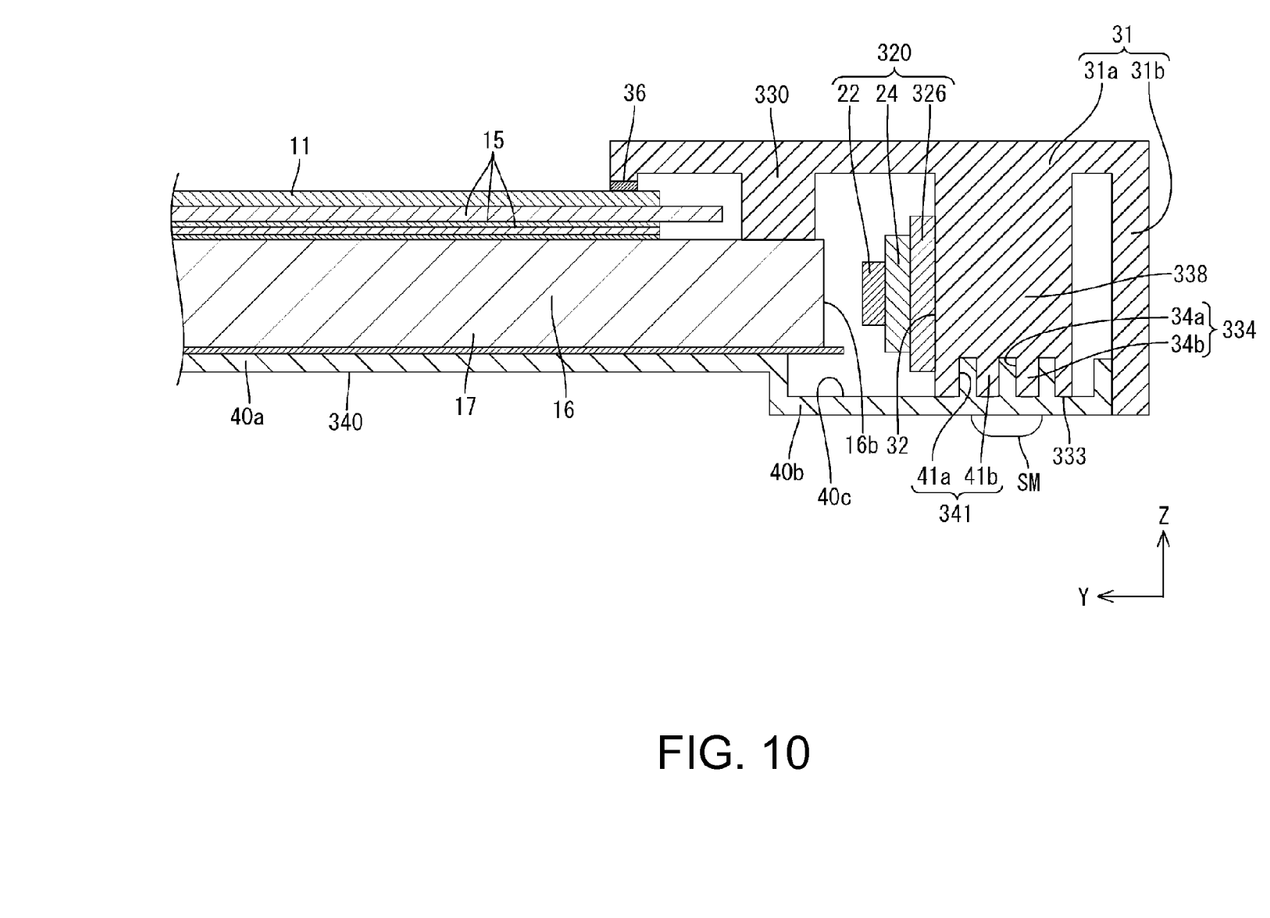
FIG. 10 is a magnified cross-sectional view that shows a cross-sectional configuration of the liquid crystal display device according to Embodiment 4 of the present invention along the short side direction showing recesses and protrusions of the frame and recesses and protrusions of the chassis.

Embodiment 4 of the present invention will be described with reference to FIG. 10. Embodiment 4 is different from the respective embodiments mentioned above in that the structures of the frame 330 and the LED unit 320 are different. Descriptions of structures, operations, and effects similar to those of the embodiments described above will be omitted.

The LED unit 320 is formed of an LED substrate 24, LEDs 22, and a heat dissipating member 326. The heat dissipating member 326 is a plate shape member having heat dissipating characteristics and is disposed along the long side direction of a chassis 340. The plate surface of the heat dissipating member 326 is disposed so as to be perpendicular to the plate surface 40c of the chassis 340. The LED substrate 24 is attached to one of the plate surfaces (light guide plate 16 side plate surface) of the heat dissipating member 326.

A screw attaching section 338 where a screw member SM can be attached is integrally formed with the frame 330 in a position of a panel pressing portion 31a farther inwards (towards the light guide plate 16) than the side wall 31b. The screw attaching sections 338 protrude from the inner surfaces of the panel pressing portions 31a toward the rear side in the Z axis direction, and are each formed in a substantially block shape that is horizontally long and that extends along the respective sides of the panel pressing portions 31a (X axis direction or Y axis direction). According to this type of configuration, the screw member SM is screwed into the screw attaching section 338 through a screw attaching hole (not shown) to attach the chassis 340 to the frame 330.

A light source attachment section 32 is a surface on the light guide plate 16 side (surface on the opposing side of the side wall 31b) of the screw attaching section 338. The light source attachment section 32 is attached to the heat dissipating member 326 while making surface-to-surface contact with the other plate surface of the heat dissipating member 326 (plate surface on the side opposite to the light guide plate 16). The chassis abutting portion 333 is a surface of the screw attaching section 338 facing the chassis 340 (surface on the side opposite to the panel pressing portion 31a). According to this type of configuration, the light source attachment section 32 and the chassis abutting portion 333 are disposed between the LEDs 22 and the chassis 40.

In the present embodiment, because the light source attachment section 32 and the chassis abutting portion 333 are formed on the screw attaching section 338, the light source attachment section 32 and the chassis abutting portion 333 do not need to be provided separately from the screw attaching section 338.

In the present embodiment, because the LED substrate 24 is attached to the light source attachment section 32 through the heat dissipating member 326, heat from the LEDs 22 can be quickly transferred to the frame 330 through the LED substrate 24 and the heat dissipating member 326. As a result, the heat dissipating characteristics of the liquid crystal display device 10 can be increased.

<Other Embodiments>

The present invention is not limited to the embodiments shown in the drawings and described above, and the following embodiments are also included in the technical scope of the present invention, for example.

(1) In the respective embodiments above, examples in which recesses 41a and protrusions 41b included among the recesses and protrusions 41 of the chassis extend along the edges of the chassis 40 were provided, but the recesses and protrusions 41 of the chassis are not limited to this. The present invention includes recesses and protrusions of the chassis being provided in parallel with each other along the edges of the chassis.

(2) In the respective embodiments above, examples are described of the recesses and protrusions 41 of the chassis 40 being disposed along the entire periphery of the outside edge portions, but the configuration of the recesses and protrusions 41 of the present embodiment is not limited to this. The present invention also includes cases in which the recesses and protrusions of the chassis are disposed along only the edges of the outside edges having a light source, and cases in which the recesses and protrusions of the chassis are provided to avoid the portion where a screw member or the like is attached. In this case, a configuration in which the recesses and protrusions of the chassis are at least disposed along an edge having a light source is suitable because this allows heat from the light source to be transferred to the chassis with ease.

(3) In Embodiment 3, an example in which thermal grease 250 is provided between the recesses and protrusions 41 of the chassis and the recesses and protrusions 34 of the frame was described, but the present invention is not limited to this. A similar effect can be obtained even if a thermal sheet is interposed therebetween instead of the thermal grease 250, for example.

(4) Besides the respective embodiments above, as long as the recesses and the protrusions of the chassis and the frame can engage each other, the shape, configuration, position, and the like can be modified as appropriate.

(5) In the respective embodiments above, examples in which the bottom plate portion 40a of the chassis 40 and the light source housing portion 40b are formed in a step shape are described, but the present invention also includes structures in which the bottom plate portion and the light source housing portion are flush with each other.

(6) In addition to the respective embodiments above, the present invention also includes a pair each or four in total of the LED units (LED substrates) being disposed so as to respectively face the ends of both long sides and short sides of the light guide plate, or one LED unit being disposed so as to only face an end of one long side or one short side of the light guide plate. The present invention also includes a configuration in which three LED units are disposed at three side edges of the light guide plate so as to face each other.

(7) In the respective embodiments above, LEDs were used as the light source, but other types of light sources such as an organic EL element may also be used.

In the embodiments above, TFTs are used as the switching element in the liquid crystal display device, but the present invention can be applied to a liquid crystal display device that uses a switching element other than a TFT (a thin film diode (TFD), for example), and, other than a color liquid crystal display device, the present invention can also be applied to a black and white liquid crystal display device.

(9) In the respective embodiments above, a liquid crystal display device using a liquid crystal panel as a display panel was shown as an example, but the present invention is also applicable to a display device that uses another type of display panel.

(10) In the respective embodiments above, a television receiver that includes a tuner part was illustratively shown, but the present invention is also applicable to a display device without a tuner part.

DESCRIPTION OF REFERENCE CHARACTERS 10 liquid crystal display device (display device)
11 liquid crystal panel (display panel)
11a display surface
16 light guide plate
16b light receiving face (side face)
22 LED (light source)
24 LED substrate (light source substrate)
30, 130, 320 frame
31 exterior member
32 light source attachment section
33 chassis abutting section
34, 134, 334 recesses and protrusions of frame
34a, 134a recesses
34b, 134b protrusions
40, 140, 340 chassis
40c plate surface
41, 141, 341 recesses and protrusions of chassis
250 thermal grease
326 heat dissipating member
TV television receiver

What is claimed is:

1. A display device, comprising:
a light source;
a display panel that performs display using light from the light source;
a light guide plate arranged to overlap a rear side of the display panel opposite to a display surface thereof, the light guide plate having a side face facing the light source;
a chassis disposed on a rear side of the light guide plate opposite to the display panel, the chassis having a plate shape with recesses and protrusions aligned on a front surface thereof; and
a frame member disposed on the display surface side of the display panel, the frame member and the chassis housing therebetween the light source, the display panel, and the light guide plate, the frame member having the light source attached thereto and having recesses and protrusions that can engage the recesses and the protrusions of the chassis, the recesses and the protrusions of the frame member engaging the recesses and the protrusions of the chassis,
wherein a pattern of the recesses and the protrusions of the chassis extends along an edge portion of the chassis, and
wherein the recesses and the protrusions are provided on an entire periphery of the chassis.

2. A display device, comprising:
a light source;
a display panel that performs display using light from the light source;
a light guide plate arranged to overlap a rear side of the display panel opposite to a display surface thereof, the light guide plate having a side face facing the light source;

a chassis disposed on a rear side of the light guide plate opposite to the display panel, the chassis having a plate shape with recesses and protrusions aligned on a front surface thereof; and a frame member disposed on the display surface side of the display panel, the frame member and the chassis housing therebetween the light source, the display panel, and the light guide plate, the frame member having the light source attached thereto and having recesses and protrusions that can engage the recesses and the protrusions of the chassis, the recesses and the protrusions of the frame member engaging the recesses and the protrusions of the chassis, wherein the protrusions of the chassis are a plurality of ribs protruding from the front surface of the chassis.

3. A display device, comprising:

a light source;

a display panel that performs display using light from the light source;

a light guide plate arranged to overlap a rear side of the display panel opposite to a display surface thereof, the light guide plate having a side face facing the light source;

a chassis disposed on a rear side of the light guide plate opposite to the display panel, the chassis having a plate shape with recesses and protrusions aligned on a front surface thereof; and a frame member disposed on the display surface side of the display panel, the frame member and the chassis housing therebetween the light source, the display panel, and the light guide plate, the frame member having the light source attached thereto and having recesses and protrusions that can engage the recesses and the protrusions of the chassis, the recesses and the protrusions of the frame member engaging the recesses and the protrusions of the chassis, wherein the recesses and the protrusions of the frame member and the recesses and the protrusions of the chassis engage each other through thermal grease or a thermal sheet.

4. The display device according to claim 1, wherein the frame member has a light source attachment section that faces the side face of the light guide plate and has the light source attached thereto, and a chassis abutting portion that is adjacent to the light source attachment section, has the recesses and the protrusions, and abuts the chassis.

5. The display device according to claim 4, wherein the frame member has an L shape in a cross-sectional view, and further includes an exterior member forming an exterior of the display device.

6. The display device according to claim 1, further comprising:

a light source substrate where the light source is mounted, wherein the light source is attached to the frame member through the light source substrate.

7. The display device according to claim 6, further comprising:

a heat dissipating member to which the light source substrate is attached, wherein the light source substrate is attached to the frame member through the heat dissipating member.

8. The display device according to claim 1, wherein the light source is a white-light emitting diode.

9. The display device according to claim 8, wherein the display panel is a liquid crystal panel including a pair of substrates and liquid crystal sealed therebetween.

10. A television receiver, comprising the display device according to claim 8.

11. The display device according to claim 2, wherein the frame member has a light source attachment section that faces the side face of the light guide plate and has the light source attached thereto, and a chassis abutting portion that is adjacent to the light source attachment section, has the recesses and the protrusions, and abuts the chassis.

12. The display device according to claim 11, wherein the frame member has an L shape in a cross-sectional view, and further includes an exterior member forming an exterior of the display device.

13. The display device according to claim 3, wherein the frame member has a light source attachment section that faces the side face of the light guide plate and has the light source attached thereto, and a chassis abutting portion that is adjacent to the light source attachment section, has the recesses and the protrusions, and abuts the chassis.

14. The display device according to claim 13, wherein the frame member has an L shape in a cross-sectional view, and further includes an exterior member forming an exterior of the display device.

15. The display device according to claim 2, further comprising:

a light source substrate where the light source is mounted, wherein the light source is attached to the frame member through the light source substrate.

16. The display device according to claim 15, further comprising:

a heat dissipating member to which the light source substrate is attached, wherein the light source substrate is attached to the frame member through the heat dissipating member.

17. The display device according to claim 3, further comprising:

a light source substrate where the light source is mounted, wherein the light source is attached to the frame member through the light source substrate.

18. The display device according to claim 17, further comprising:

a heat dissipating member to which the light source substrate is attached, wherein the light source substrate is attached to the frame member through the heat dissipating member.

* * * * *